United States Patent [19]
Ward

[11] Patent Number: 5,458,171
[45] Date of Patent: Oct. 17, 1995

[54] APPARATUS FOR CUTTING TENON AND MORTISE INTERLOCKING JOINTS

[75] Inventor: Kevin Ward, Louisville, Ky.

[73] Assignee: Vermont American Corporation, Louisville, Ky.

[21] Appl. No.: 266,967

[22] Filed: Jun. 27, 1994

[51] Int. Cl.⁶ .................. B27F 5/00; B27C 5/00
[52] U.S. Cl. .................. 144/84; 33/700; 33/679.1; 83/468; 83/468.7; 144/2 R; 144/85; 144/144 R; 144/204; 144/371; 144/372; 144/144.5 R; 269/58; 269/240; 269/249; 269/291; 269/298; 269/307
[58] Field of Search .................. 33/501, 679.1, 33/700, 758; 83/451, 453, 467.1, 468, 468.1; 144/2 R, 82, 83, 84, 85, 87, 88, 144 R, 144.5, 198 R, 203, 204, 253 R, 371, 372; 269/55, 56, 58, 189

[56] References Cited

U.S. PATENT DOCUMENTS

| | | | |
|---|---|---|---|
| 2,764,191 | 9/1956 | Hartmann | 144/87 |
| 3,109,466 | 11/1963 | Jones | 144/144.5 R |
| 3,789,892 | 2/1974 | Converse et al. | 144/27 X |
| 4,168,730 | 9/1979 | Keller | 144/87 X |
| 4,405,003 | 9/1983 | Dicke | 144/87 X |
| 4,479,523 | 10/1984 | Peterson et al. | 144/144.5 R |
| 4,607,673 | 8/1986 | McCord, Jr. | 144/144.5 R |
| 4,965,943 | 10/1990 | Adams | 33/758 |
| 5,123,463 | 6/1992 | Grisley | 144/83 |
| 5,285,832 | 2/1994 | Gibson | 144/144.5 |
| 5,318,082 | 6/1994 | Von Hollen | 144/84 |

Primary Examiner—W. Donald Bray
Attorney, Agent, or Firm—Middleton & Reutlinger; Charles G. Lamb

[57] ABSTRACT

An apparatus for making tenons and mortises includes a table with a first opening in the top surface thereof. The top surface is disposed for receiving a sliding base assembly for a cutting device having a second opening therein. A work-piece holding assembly is detachably connected to a front portion of the table. The table and sliding base assembly cooperate to define the movement of the sliding base assembly in relation to said first opening. The work-piece holding assembly is positionable at preselected angles and varying vertical positions in relation to the top surface of the table.

18 Claims, 11 Drawing Sheets

APPARATUS FOR CUTTING TENON AND MORTISE INTERLOCKING JOINTS

BACKGROUND OF THE INVENTION

The present invention relates to an apparatus for cutting mechanically interlocking joints, specifically tenons and mortises for wood and other wood-type materials. More specifically, the present invention provides an apparatus for cutting both mortise and tenon configured joints on one apparatus. Even more specifically, the present invention provides an apparatus for cutting angle tenon cuts in a work-piece as well as mitered tenon cuts in a work-piece.

In the joining of two pieces of wood and other wood-type materials, various types of joints are utilized. The most common types of joints are referred to as dowel pin joints, dado joints, "box-cut" joints, blind, half-blind, and open "dove-tail" joints at a 90° angle to form a box-like structure; and, "mortise" and "tenon" joints.

Generally, in the cutting of tenons, tenons have been cut using a table saw, radial saw or a router table and the cut has been pre-scribed on the work-piece to define the line of the desired cut. In a mortise cut, the outline of the cut has also been pre-scribed and a drill press has been the most common means for making the cut with a square chisel utilized to finish the desired pre-scribed cut. Thus, it has been common practice to utilize two different types of apparatuses to obtain both tenon and mortise cuts in joints for work-pieces of a box-cut configuration, particularly those useful in attachment of legs to chairs and tables in the furniture industry.

SUMMARY OF THE INVENTION

An object of the present invention is to provide an apparatus for cutting a plurality of different sizes of tenon and mortise cuts in work-pieces which is portable and easy manipulated in cutting two work-pieces which are to be joined together.

Another object of the present invention is to provide an apparatus for cutting mating tenon and mortise cuts in work-pieces to be joined together.

A further object of the present invention is to provide an apparatus for cutting tenon and mortise pieces forming a box-like structure joint without the need for pre-scribing the outlines of the proposed cuts.

An even further object of the present invention is to provide an apparatus for making angle tenon cuts, miter tenon cuts, and open-end mortise cuts in work-pieces.

Also, an object of the present invention is to provide an apparatus for making mortise and tenon cuts which substantially reduces the mathematical calculations in determining the size and location of the cuts.

An object of the present invention is to provide an apparatus for making mortise and tenon cuts without the use of templates or other patterns.

Particularly, the present invention is directed to an apparatus for making tenon and mortise cuts in work-pieces comprising:

a table having a first opening in a top surface thereof;

a detachable support for holding a work-piece in a pre-selected position, said support being detachably connected to said table;

means for positioning said work-piece in said support;

a base assembly for a cutting means slidably mounted onto said support, said base assembly having a second opening therein to receive said cutting means therethrough, said second opening being adjustable and positionable in cutting relation with one end of said work-piece; and, means to determine the size and location of said second opening and define the slidable movement of said base assembly on said table, said second opening size and location and the movability of said second opening defining the appropriate peripheral cutting boundaries on said end of said work-piece to be subjected to said cutting means.

These and other advantages of the present invention will become apparent to those skilled in the art upon reference to the following detailed description:

BRIEF DESCRIPTION OF THE DRAWINGS

The description refers to the accompanying drawings in which like parts are given like reference numerals and wherein.

DETAILED DESCRIPTION OF THE PREFERRED EMBODIMENT

Figure 1:
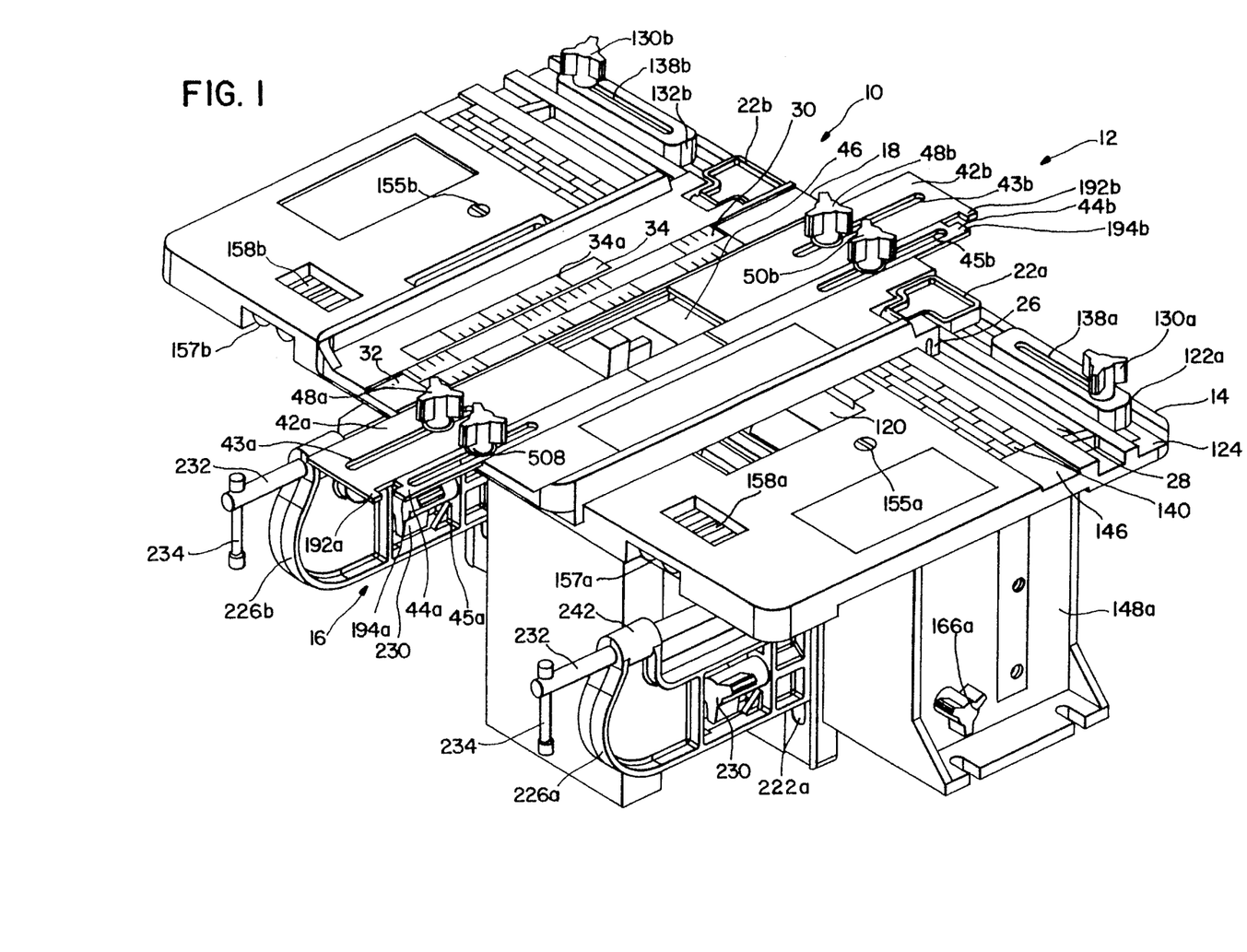
FIG. 1 is an isometric view of a preferred apparatus of the present invention.

As best seen in FIG. 1, the preferred embodiment of the apparatus of the present invention is designated by the numeral 10. The apparatus 10 includes a sliding router base assembly 12, a table 14 upon which the sliding router base assembly 12 is movable thereon and a work-piece holding assembly 16 which is mounted to the front of the table 14.

Figure 2:
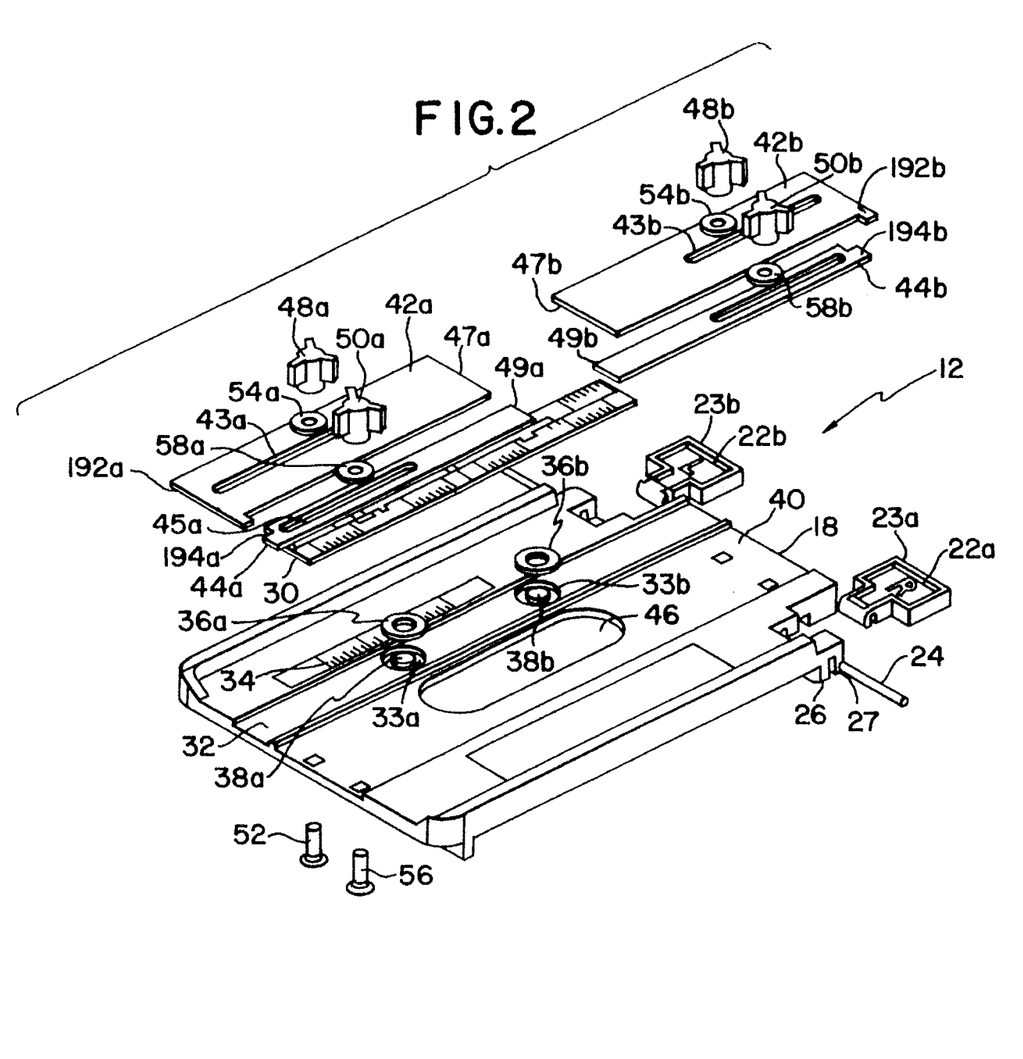
FIG. 2 is an exploded view of a sliding router base assembly of the preferred apparatus of FIG. 1.

As best seen in FIG. 2, the sliding router base assembly 12 includes a sliding router base member 18 which is provided with an opening 46 therein to receive a router (not shown). The sliding router base 18 is provided with a movable flange portion 26 which is received within groove 28 (FIG. 3) of the table 14 for movement therein. The flange 26 is provided with an open ended slot 27 therein to receive the stop member holding and pivot rod 24 therethrough. Mounted to opposite ends of the pivot rod 24 are X-direction stop members 22a and 22b. The X-direction stop members 22a and 22b are utilized for stopping the movement of the sliding router base assembly 12 in an X-direction as will be discussed more fully hereinafter.

The sliding router base 18 is also provided with a recess 40 that runs longitudinally thereof and receives movable Y-directional stop members 42a, 42b and movable Y-directional router bushing repeat stop members 44a, 44b. The movable Y-directional stops 42a, 42b are provided with slots 43a, 43b therein which receive mounting bolts 52 therethrough. The mounting bolts 52, only one being shown for slot 43a, extend through the slots 43a, 43b, and are received by rotable clamping knobs 48a, 48b, respectively. Washers 54a, 54b may also be provided. The mounting bolts 52 in combination with rotatable clamping knobs 48a, 48b provide the means for loosening and tightening the Y-direction movable stop members 42a, 42b upon positioning as discussed hereinafter. The positioning of the Y-direction stop members 42a, 42b define the Y-directional movement of the router.

The movable Y-directional router bushing repeat stop members 44a, 44b are provided with slots 45a, 45b therein which receive mounting bolts 56 therethrough. The mounting bolts 56, only one being shown for slot 45a, extend through the slots 45a, 45b and are received by rotatable clamping knobs 50a, 50b, respectively. Washers 58a, 58b may also be provided. The mounting bolts 56 in combination with rotatable clamping knobs 50a, 50b provide the means for tightening and loosening stops 44a, 44b, as discussed hereinafter.

The sliding router base 18 is provided with a fixed Y-directional scale 34 and a magnetic movable Y-directional scale 30 which is received within the movable Y-directional scale receiving groove 32.

Since the sliding router base 18 is generally made from a material which is non-metallic, means must be provided to hold the magnetic Y-directional scale member 30 thereon. Thus, the groove 32 is provided with steel washer cutouts 33a, 33b for receiving steel washers 36a, 36b, respectively, therein. Vertically extending positioning posts 38a, 38b, respectively, are provided for receiving the steel washers 36a, 36b thereon. The cutouts 33a, 33b are substantially the same thickness as the washers 36a, 36b so that the surface of the groove 32 is flat and smooth for movably receiving the magnetic movable Y-directional scale member 30 therein.

Figure 3:
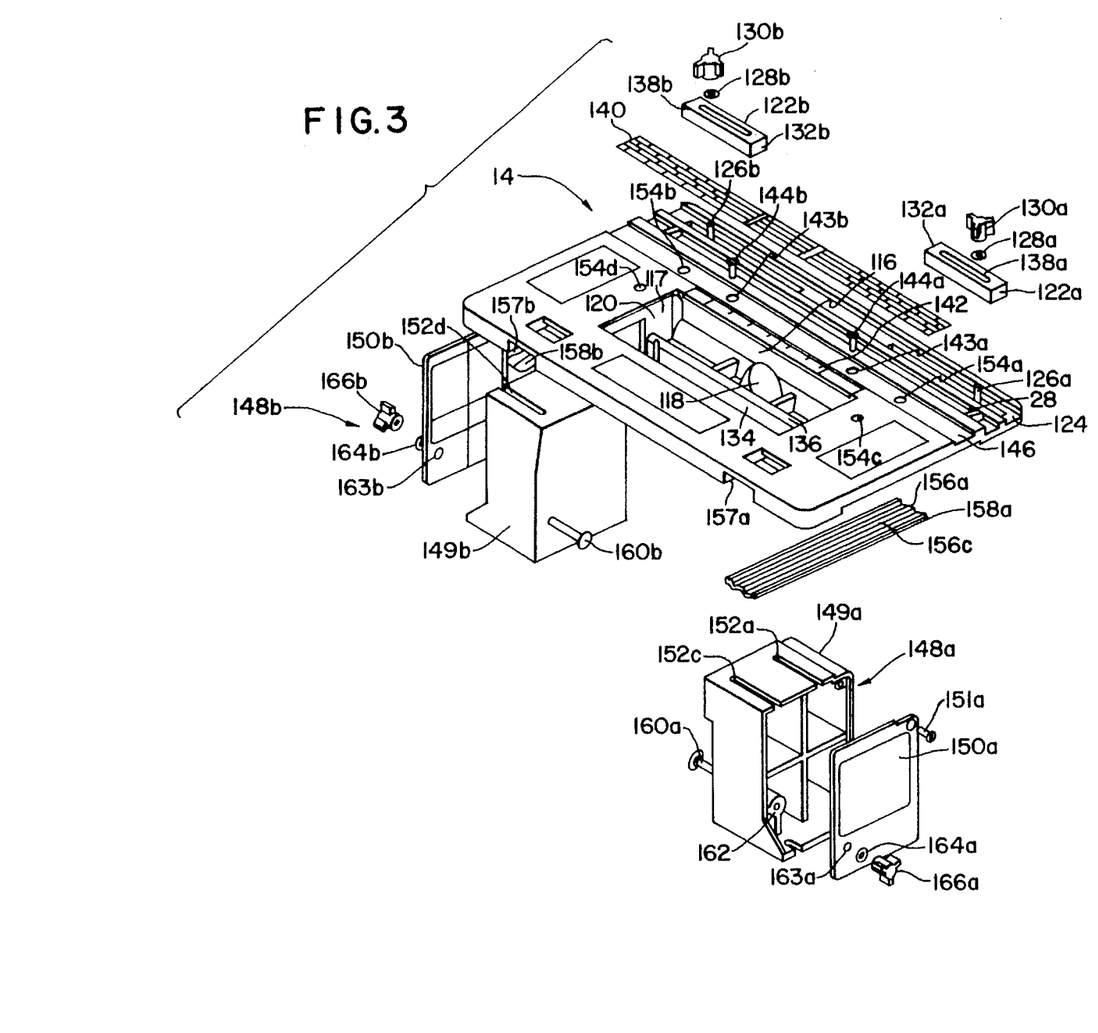
FIG. 3 is an exploded view of a table of the preferred apparatus of FIG. 1.

As best seen in FIG. 3, the table 14 is provided with an opening 120 for receiving a router (not shown) therethrough. The back of the opening 120 is defined by a downwardly extending back wall 116 with a vacuum port 118 therein for removal of wood chips during the cutting operation. Sidewalls 117, which define the sides of the opening 120, only one sidewall 117 being exposed in FIG. 3, are provided for mounting a hook receiving plate member 134 therebetween. The hook receiving member 134 is provided with an upper edge 136 of arcuate configuration. The radius of curvature of upper edge 136 is such that upon receiving C-shaped hook 258, FIG. 4, of the work-piece holding assembly 16, the work-piece holding assembly 16 is rotatably mounted onto table 14.

The table 14 is provided with a groove 124 for receiving the sliding X-direction stop members 122a and 122b therein. The groove 124 is also provided with a pair of openings on opposite ends thereof (not shown) for receiving stop member mounting bolts 126a, 126b therethrough. The sliding X-directional stop members 122a, 122b are also provided with elongated slots 138a, 138b, respectively therein, to receive the bolts 126a, 126b therethrough. Washers 128a, 128b and rotatable clamping knobs 130a, 130b are provided for receiving the bolts 126a, 126b, respectively, therethrough. Loosening and tightening the clamping knobs 130a, 130b, provide for the means for the movement of the sliding X-directional stop members 122b, 122b within the groove 124. The sliding X-directional stop members 122a, 122b are also provided with stop edges 132a, 132b, respectively, wherein upon positioning of the sliding x-direction stop members 122a, 122b, the stop edges 132a, 132b define the X-directional movement of the sliding router base assembly 12.

The table 14 is also provided with an X-scale receiving groove 146 to receive the flexible magnet movable X-scale member 140. As noted previously, the apparatus 10 is generally made from a non-metallic material and therefore metal means for holding the flexible magnetic movable X-scale member 140 is required. As shown in FIG. 3, the groove 146 is provided with openings 143a, 143b for receiving metal screws 144a, 144b, respectively, therethrough for holding the magnetic scale 140 within the groove 146.

Figure 5:
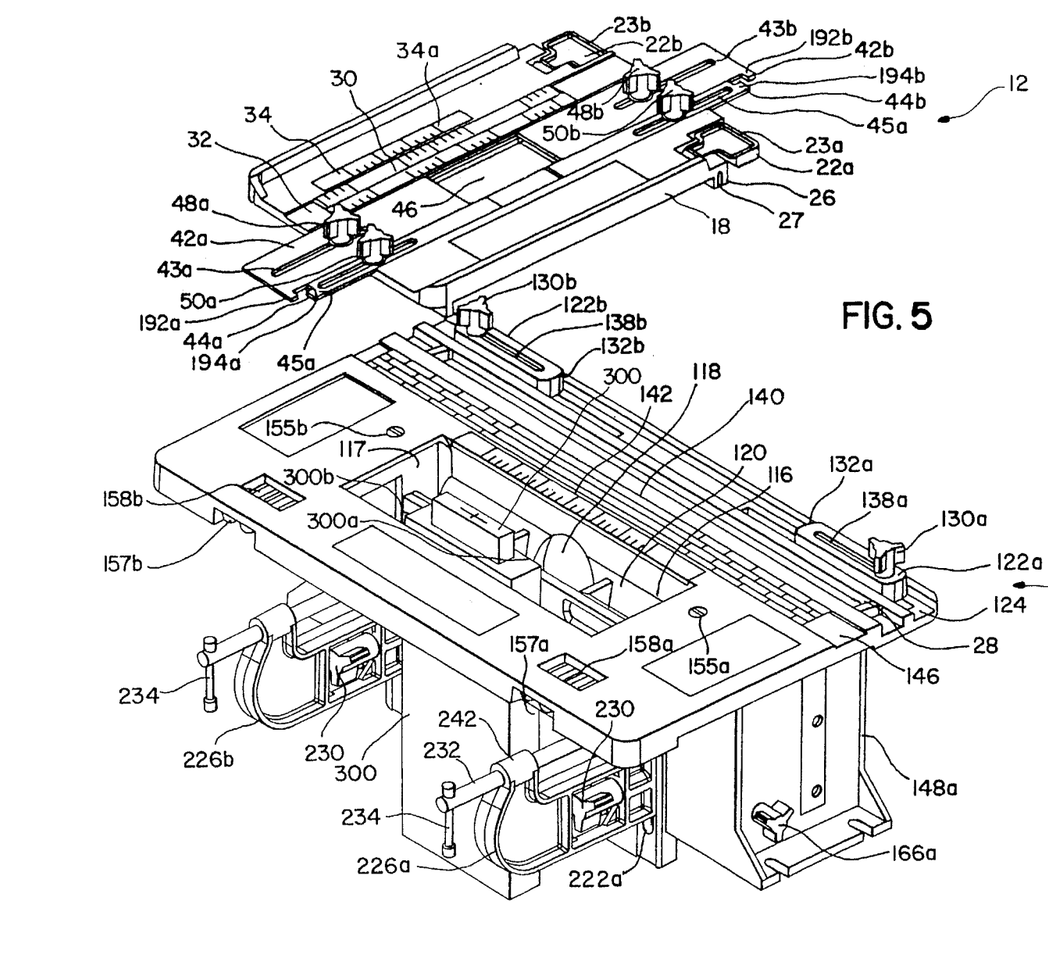
FIG. 5 is an isometric view of the table and vertical work-piece holding assembly of FIG. 1 including a work-piece with a tenon cut therein with the slider router base assembly being removed from the apparatus.
Figure 6:
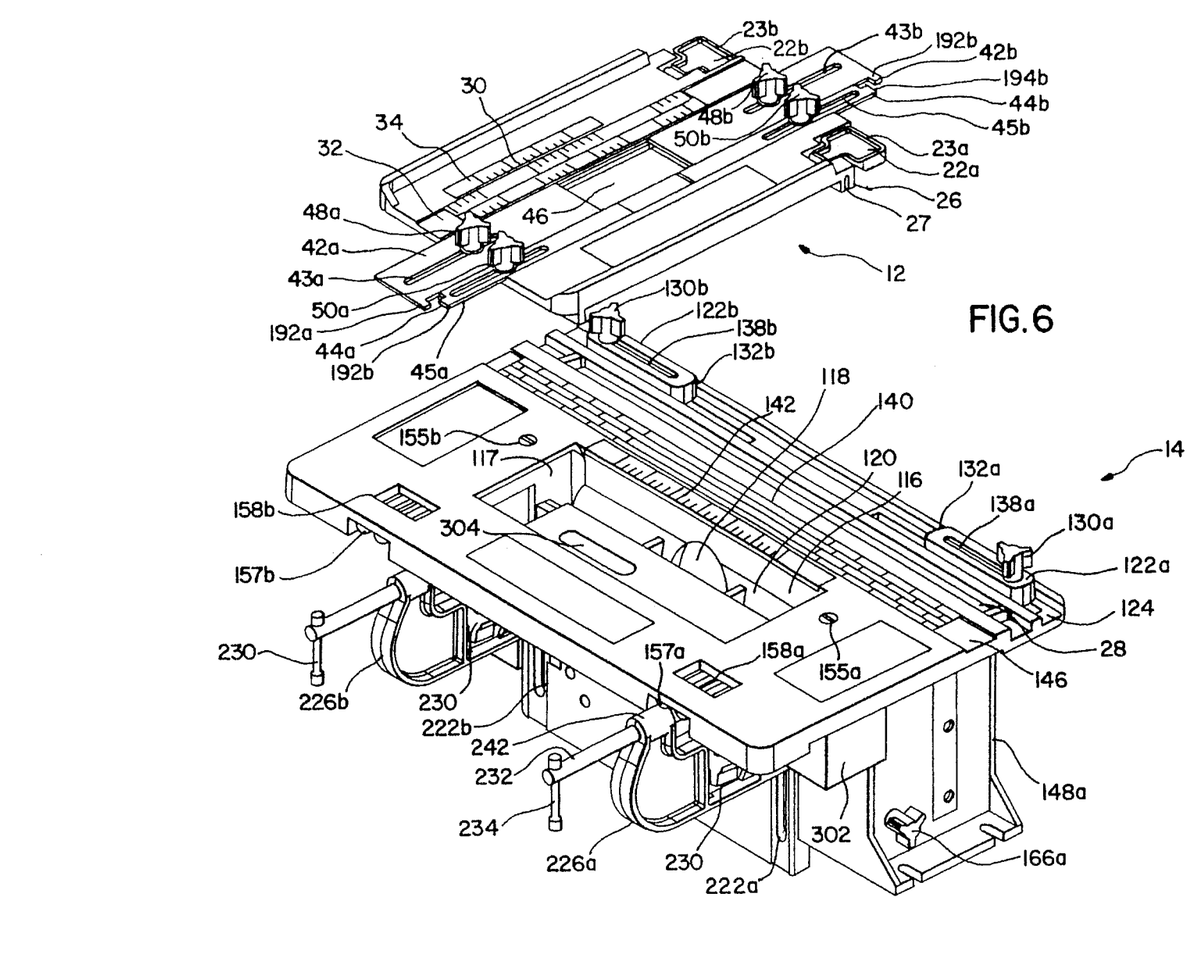
FIG. 6 is an isometric view of the table and vertical work-piece holding assembly of FIG. 1 with a work-piece in a mortise cut position with the sliding router base assembly removed from the apparatus.

The table 14 is supported by a pair of legs 148a, 148b on opposite sides thereof. The legs 148a, 148b are provided with covers 150a, 150b, respectively, which are attached thereto by appropriate mounting bolts 151a, 151b, respectively. The leg housing 149a, includes a pair of openings 152a, 152c, and leg housing 149b includes a pair of openings 152b, 152d for receiving mounting bolts therethrough, only two openings being shown and identified by numerals 155a, 155b (FIGS. 1, 5 and 6). The mounting bolt openings 152a, b, c, d are in alignment with openings 156a, 156b in table brace support member 158a, and corresponding openings (not shown) in table brace support member 158b, as well as openings 154a, b, c, d, in table 14. The mounting bolts (not shown) extend through the aligned openings, for example 152a, with 156a, and 154a for attaching leg 148a to the table 14. On opposite sides of the table 14 are transversely extending grooves 157a and 157b for receipt of the table brace supports 158a and 158b therein.

Wedge adjusting bolts 160a and 160b are provided for positioning movable wedge work-piece holding member 168 (FIG. 4) in an angular position for making angle-cut tenons. The adjustable or movable wedge 168 is provided with wedge positioning slots 170 (FIG. 4), which receive the wedge positioning mounting bolts 160a, 160b, respectively, therethrough. The bolts 160a, 160b are mounted to the legs 148a, 148b through fixed sleeves which are unitary with the housings 149a, 149b and which extend transverse of the legs 148a, 148b, respectively. Only one sleeve 162 in housing 149a is shown. The threaded ends of the bolts 160a, 160b, extend through openings 163a, 163b, respectively, in the covers 150a, 150b, respectively, and are threadably received by rotatable adjusting knobs 166a, 166b with washers 164a, 164b, respectively, positioned between the knobs 166a, 166b, and the openings 163a, 163b. Adjusting knobs 166a, 166b, are utilized for tightening and loosening the bolts 160a, 160b in relation to the wedge positioning slots 170, so the movable wedge member 168 may be positioned at preselected angles in relation to the table 14.

Figure 4:
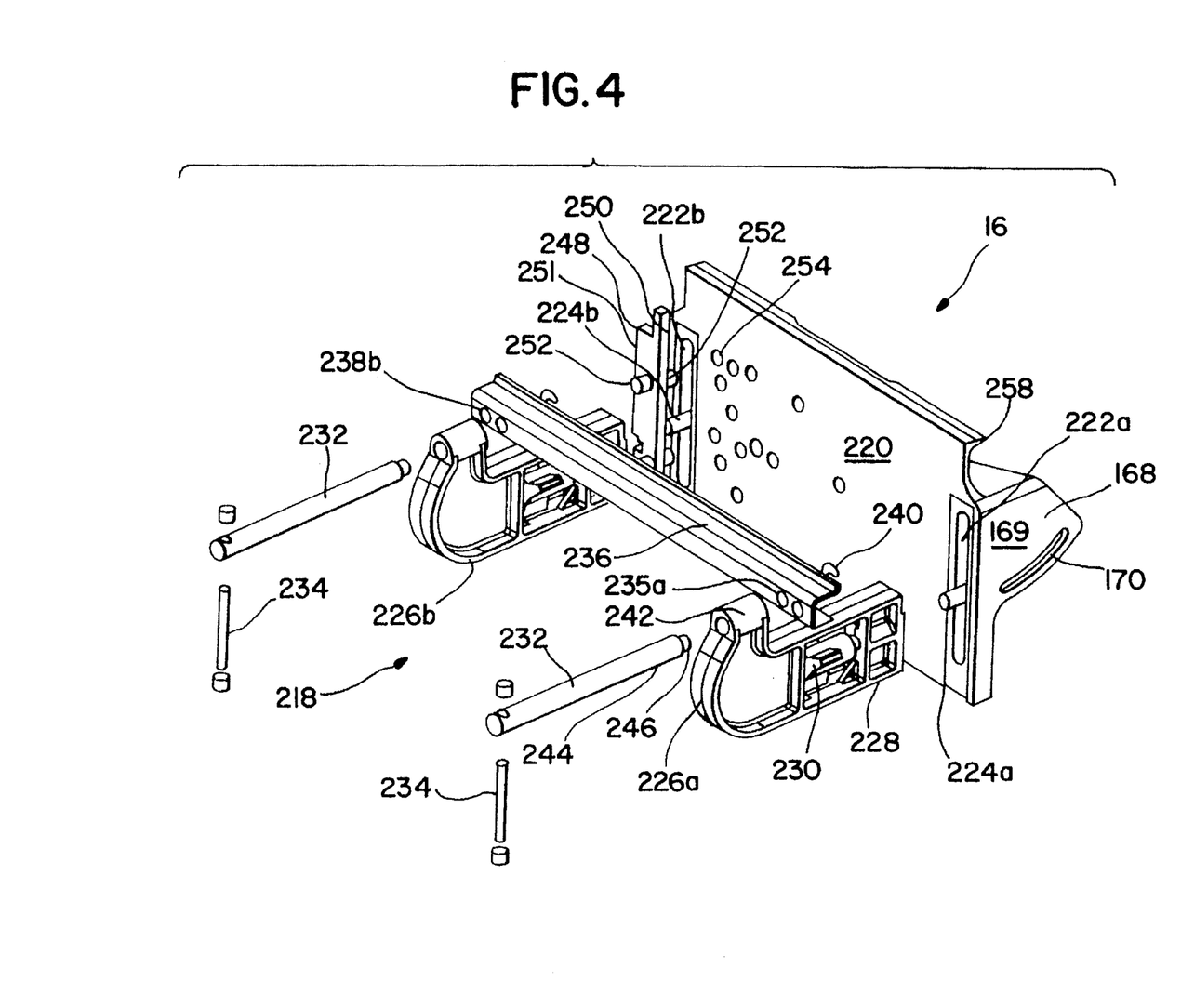
FIG. 4 is an exploded view of a vertical work-piece holding assembly of the preferred apparatus of FIG. 1.

As shown in FIG. 4, the work-piece holding assembly 16 includes the movable wedge member 168 and a clamping assembly 218. The movable wedge 168 is provided with a wedge face 220 which receives the work-piece thereon with the work-piece being held thereto by a clamping bar 236 of the clamping assembly 218. The clamping bar 236 extends from each side of the wedge 168 and is held in place by two C-shaped clamps 226a, 226b. As best shown in FIGS. 5 and 6, the work-pieces 300, 302 are sandwiched between the clamping bar 236 and the wedge face 220.

As shown in FIGS. 3 and 4, the movable wedge 168 is provided with spaced opposed side members 169, only one being shown with slots 170 therein. On opposite sides of the wedge face 220 and adjacent to the side members 169, are a pair of vertically extending positioning slots 222a, and 222b. The slots 222a and 222b receive vertical adjusting bolts 224a and 224b, respectively, therethrough. Each of the C-shaped clamps 226a, 226b is provided with a fixedly mounted sleeve 228 therein which receive the bolts 224a, 224b therethrough. In alignment with the sleeve 228 is a rotatable position adjusting knob 230 which is attached to one end of each of the bolts 224a, 224b. Upon rotation of the knobs 230, the C-clamps 226a, 226b are either pulled towards the wedge face 220 or loosened therefrom. When the C-clamp 226a, 226b are loosened, the work-piece holding assembly 16 may be moved vertically and repositioned.

As best shown in FIG. 4, each C-shaped clamp 226a, 226b is provided with a sleeve 242 thereon to receive the threaded clamping bar adjusting bolt members 232. Clamping bar 236 is provided with openings 238a, 238b therethrough on each end thereof for alignment with the sleeve 242 for receiving the threaded bolt member 232 therethrough. One end of each threaded bolt member 232 is attached to a clamp handle 234 for rotatable movement of the threaded member 232. Upon mounting the C-shaped clamps 226a, 226b to the clamping bar 236 with the threaded bolt members 232, the end of the threaded bolt member 232 opposite the clamp handle 234 is received by an E-ring 240. The threaded bolt member 232 is also provided with a shoulder 244 which has a diameter greater than the diameter of the openings 238a, 238b so that the threaded portion 246 of the mounting bolt 232 extends through the openings 238a, 238b. By rotation of the mounting bolt 232, the clamping bar 236 is moved towards or away from the wedge face 220 thereby tightening or loosening the clamping assembly 218 grip on the work-pieces as shown in FIGS. 5 and 6.

The work-piece holding assembly 16 is also provided with a work-piece adjusting stop member 248 which is used to position the work-piece at a plurality of angles from horizontal to vertical. The work-piece positioning stop member 248 is provided with an alignment edge 250 which is positionable at selected angles on the wedge face 220 and upon which the work-piece 300, 302 rests when in a cutting position. The work-piece positioning stop member 248 is provided with a plurality of positioning pins 252 thereon. The work-piece positioning member 248 is provided with two pins 252 on a front face and two pins 252 on a back face so that either the front or back of the work-piece positioning member 248 may be used. The wedge face 220 is provided with a plurality of positioning pin receiving openings 254 for receiving either the positioning pins 252 on the front face or the positioning pins 252 on the back face therein. The positioning stop member 248 can be positioned at a varying number of angles from vertical to horizontal depending upon the type of tenon cut desired. The stop member 248 may be turned over so that either pair of pins 252 may be utilized, depending upon the preselected angle desired for cutting a tenon in a work-piece. When using pins 252 on the back, an aligning edge 251 is also provided on the opposite side of the work-piece positioning stop member 248 from aligning edge 250.

Figure 7:
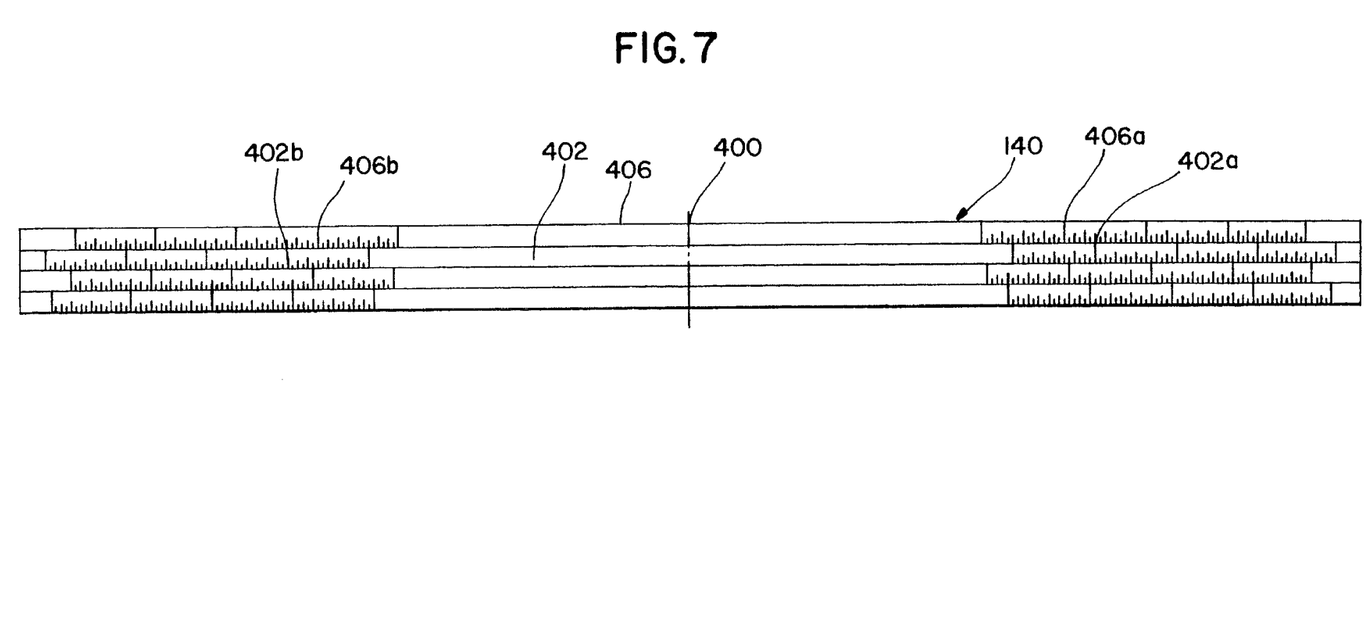
FIG. 7 is a plan view of an X-direction movable scale member of the preferred embodiment.
Figure 8:
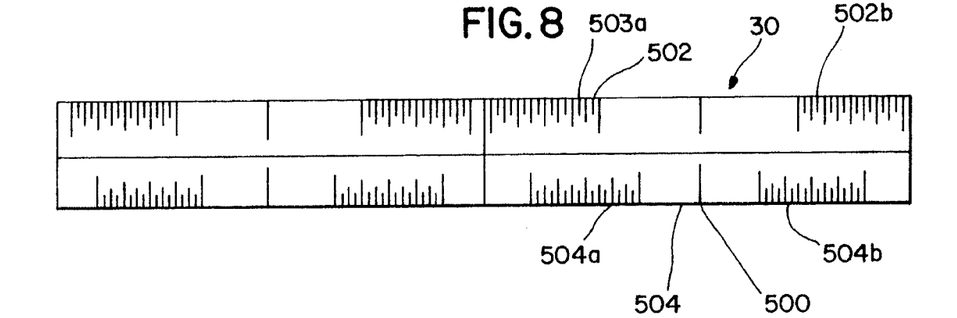
FIG. 8 is a plan view of a Y-direction movable scale member of the preferred embodiment.

FIGS. 7 and 8 are details of the two magnetic movable scales 140 and 30, respectively, used in the aligning and positioning of sliding X-direction stop member 122a, 122b and sliding Y-direction stop members 42a, 42b and 44a, 44b. In FIGS. 7 and 8, the scales 140 and 30 are shown at a reduction of their actual scale. For example, in the making of a mortise and tenon joint cut for a joint utilizing a ⅜" drill bit, a work-piece 300 for the tenon cut is positioned in the apparatus 10 as shown in FIG. 5 with the center point of the piece to be cut identified by the "X" in the center of the tenon cut. (The "X" is inscribed prior to the cut, but for illustration purposes, in FIG. 5, the "X" center point is shown after the cut.) Generally, the work-piece is positioned against workpiece stop member 248, and then the center-line 400 of the slidable scale 140 is lined up on the inscribed "X" For a 2" length cut, for example, the sliding X-direction stop members 122a and 122b are moved so that the stop edges 132a and 132b line up with the 1" mark on the movable scale 140 as noted by numerals 402a and 402b. Clamping knobs 130a and 130b for the sliding X-directional stop members 122a and 122b are tightened so that the movable stop members 122a and 122b are held securely in place. When moving the sliding router base assembly 12 in the X-direction, upon engagement with the X-directional stop edges 23a, 24b, stop members 22a, 23b on the sliding router base assembly 12 prevent further movement of the router in the X-direction.

Figure 9:
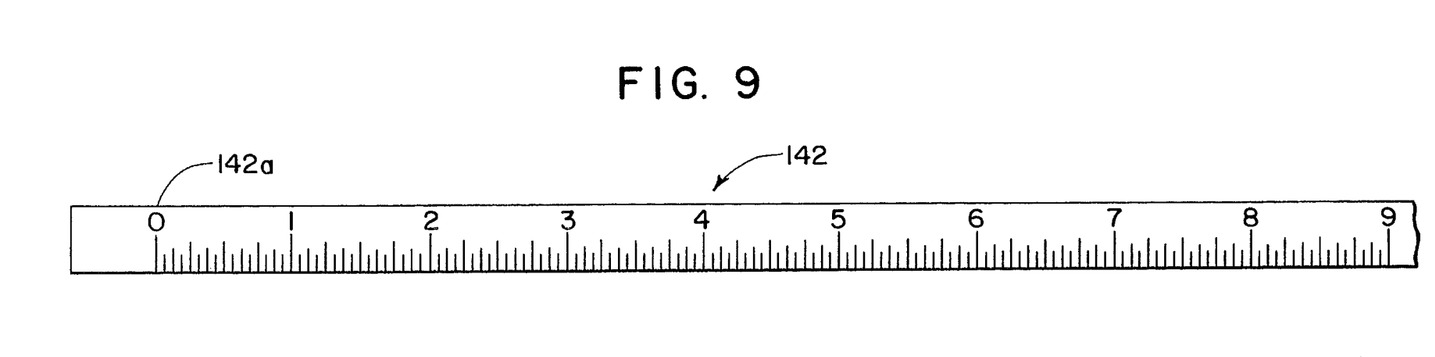
FIG. 9 is a plan view of a fixed X-direction scale member of the preferred embodiment.

Table 14 of apparatus 10 is also provided with the fixed X-scale member 142 which is also used for aligning the center-line of the movable scale 140 wherein the centering of the work-piece has not been pre-scribed as discussed previously. In this example, the "O" point of the scale member 142, as noted by the numeral 142a in FIGS. 5 and 9, is always lined up with the edge 300b (FIG. 5) and edge 250 (FIG. 4). The distance between edge 300b and the desired center-point of the cut is determined and the center-line 400 of the movable scale 140 (FIG. 7) is lined up with the terminating end of this defined distance. Thus, since the center line 400 is positioned in alignment with the center point, then the positioning of the X-stop members will be determined as discussed previously for a work-piece having a prescribed "X".

The movable Y-scale member 30 is positioned so that the center line 500 is lined up with the "X" on the work-piece as shown in FIG. 5. For a ⅜" drill, the stop edges 47a, 47b on the movable Y-stop members 42a, 42b, respectively, are positioned with the stop edges 47a and 47b being located at the 3/16" position on the scale 30 as noted by numerals 502a and 502b in FIG. 8. Also, stop edges 49a and 49b are aligned with the 502a, 502b position, respectively, on the 502 tenon scale. Clamping knobs 48a, 48b and 50a, 50b, are then tightened so that the movable stops 42a, 42b, 44a, 44b are held securely in place in the recess 40. Once all of the stop members are secured, a router is then placed within the elongated opening 46, opening 46 having a width approximately equal to the diameter of a router bushing. Therefore, the router bushing moves in a Y-direction only and the entire sliding base 18 moves in an X-direction for making the cut.

Figure 10:
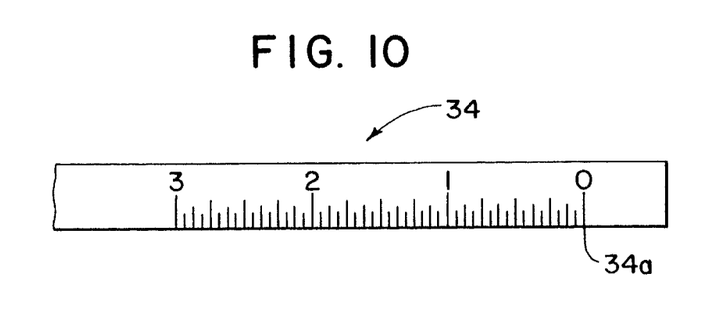
FIG. 10 is a plan view of a fixed Y-direction scale member of the preferred embodiment.

The sliding router base assembly 12 is also provided with the fixed Y-scale member 34 which is also used for aligning the center-line of the movable scale 30 wherein the centering of the work-piece has not been inscribed as discussed previously. In this situation, the "O" point of the scale member 34, as noted by the numeral 34a in FIGS. 5 and 10 is lined up with the edge 300a (FIG. 5) and wedge face 220 (FIG. 4). The distance between edge 300a and the desired center-point of the cut is determined and the center-line 500 of the movable scale 30 (FIG. 8) is lined up with the terminating end of this defined distance. Thus, since the center-line 500 is positioned in alignment with the center-point, then the positioning of the Y-stop members will be determined as discussed previously for a work-piece having a prescribed "X".

Even though the work-piece 300 as shown in FIG. 5 is positioned for a regular tenon cut, it is realized that the work-piece positioning stop member 248 may be positioned so that the positioning pins 252 are inserted into positioning pin receiving openings 254 at a desired preselected angle so that the work-piece 300 may be cut at angles of less than 90° to the table 14.

Figure 11:
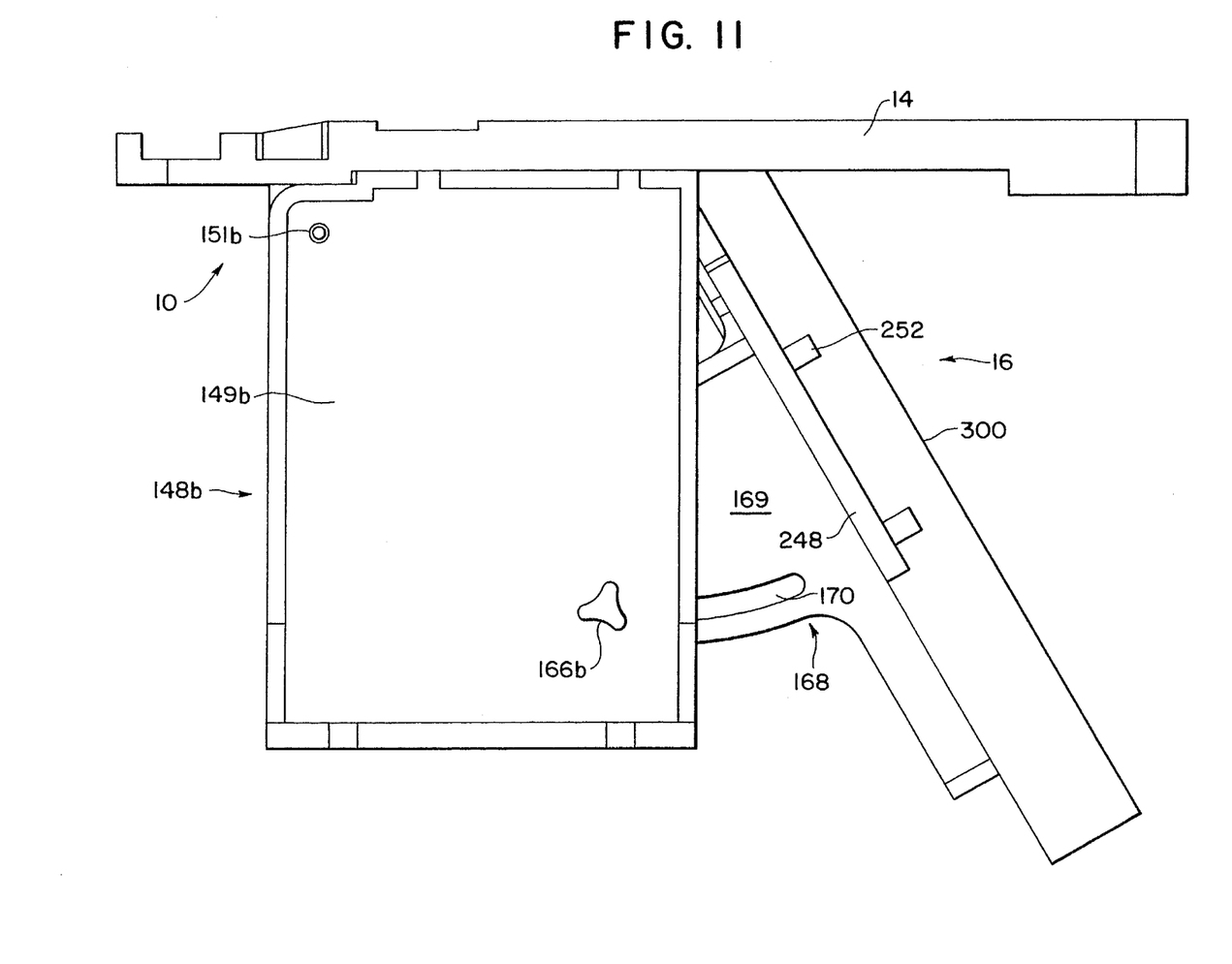
FIG. 11 is an end view of the preferred embodiment positioned to make an angled tenon cut.
Figure 12:
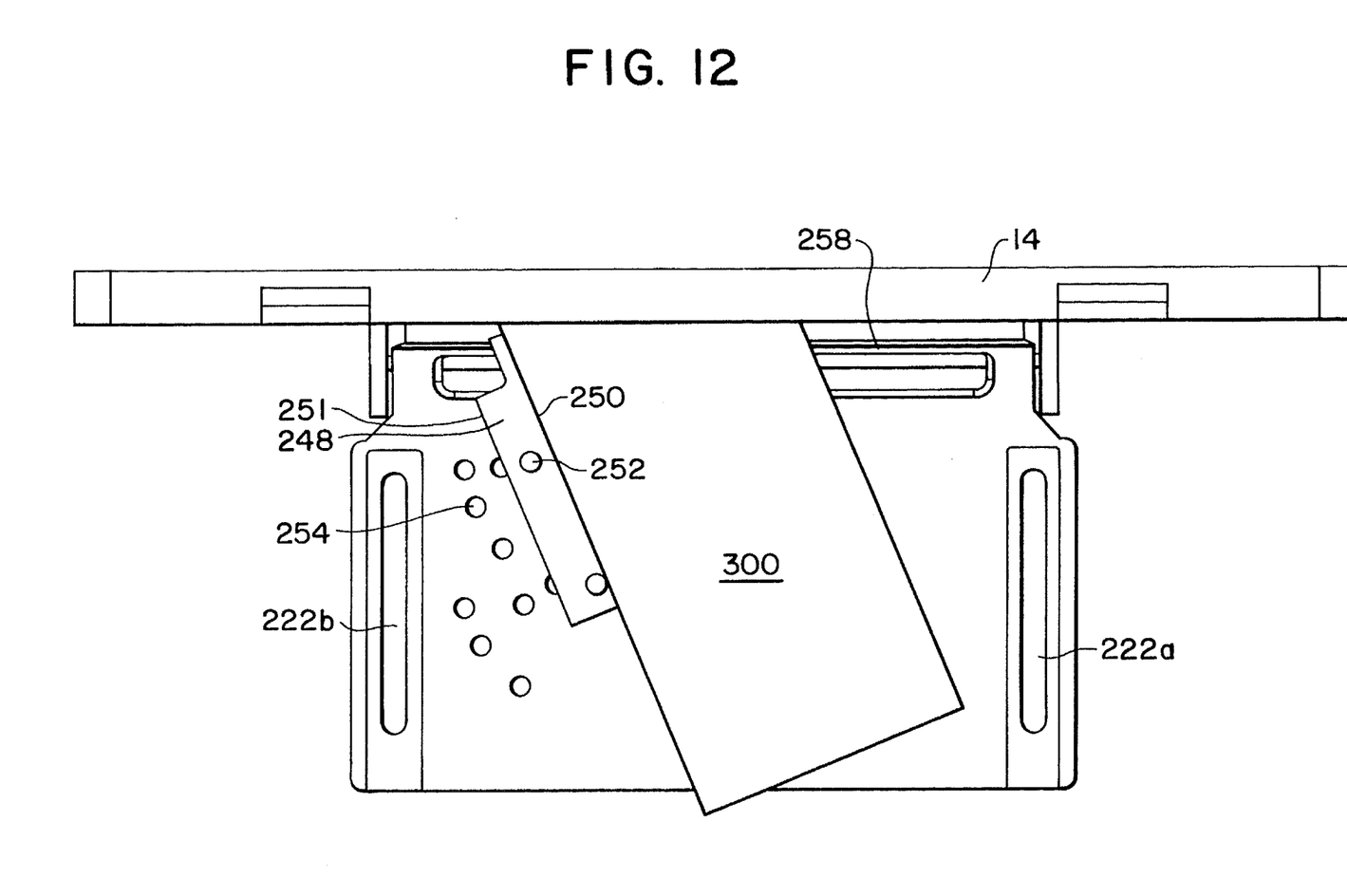
FIG. 12 is an elevational view of the preferred embodiment positioned to make a mitered tenon cut with selected portions of the work-piece holding assembly removed; and, FIG. 13 is a perspective view of a selected section of the preferred embodiment showing an alignment of a work-piece in the preferred embodiment.

Also, the work-piece 300 as shown in FIG. 5 may be positioned for an angled tenon cut. In positioning the work-piece 300 for an angled tenon cut, the movable wedge member 168 is positioned, as discussed previously and shown in FIG. 11, to the desired angle in relation to the table 14.

Furthermore, the X-directional stop members 22a and 22b are pivotably attached to the sliding router base 18 so that when removing material from outside a tenon cut greater than the diameter of the drill bit, such as ⅜", the stop members 22a and 22b can be pivoted upward so that the router can be moved further in the X-direction with a second pass around the work-piece.

Also, in the making of the second pass, the Y-directional stop members 42a, 42b are loosened for slidable movement with the router and the Y-direction router bushing repeat stop members 44a, 44b remain stationary. The stop members 42a, 42b are provided with mating L-shaped tab portions 192a, 192b, respectively, which are configured for mating with co-operating L-shaped tab portion 194a, 194b, respectively, on stop members 44a, 44b. In making the second pass, the movable stop members 42a, 42b move with the router in the Y-direction and upon completion of the second pass the L-shaped tab portion 192a, 192b prevent further movement in the Y-direction upon engagement with the L-shaped tab portions 194a, 194b, respectively. Positioning of the repeat stop members 44a, 44b enable re-producability of multiple cuts of the same shape and dimension.

As shown in FIG. 6, the work-piece 302 is positioned for a mortise cut as identified by the illustrated finished cut 304. In the use of the movable scales 140, 30 as shown in FIGS. 7 and 8 for a mortise cut, the center portion of the cut is determined in the same manner as that for a tenon cut in FIG. 5 as designated by an "X" thereon. For the mortise cut, the center line 400 of movable scale 140 is lined up with the center of the "X" and the sliding X-directional stop members 122a and 122b are moved so that the stop edge 132a is located at the 1" position noted by the numeral 406a and the stop edge 132b, of sliding X-directional stop member 122b is located at the position noted by the numeral 406b. Clamping knobs 130a and 130b are then tightened so that the movable sliding X-directional stop members 122a, 122b are held securely in place.

Figure 13:
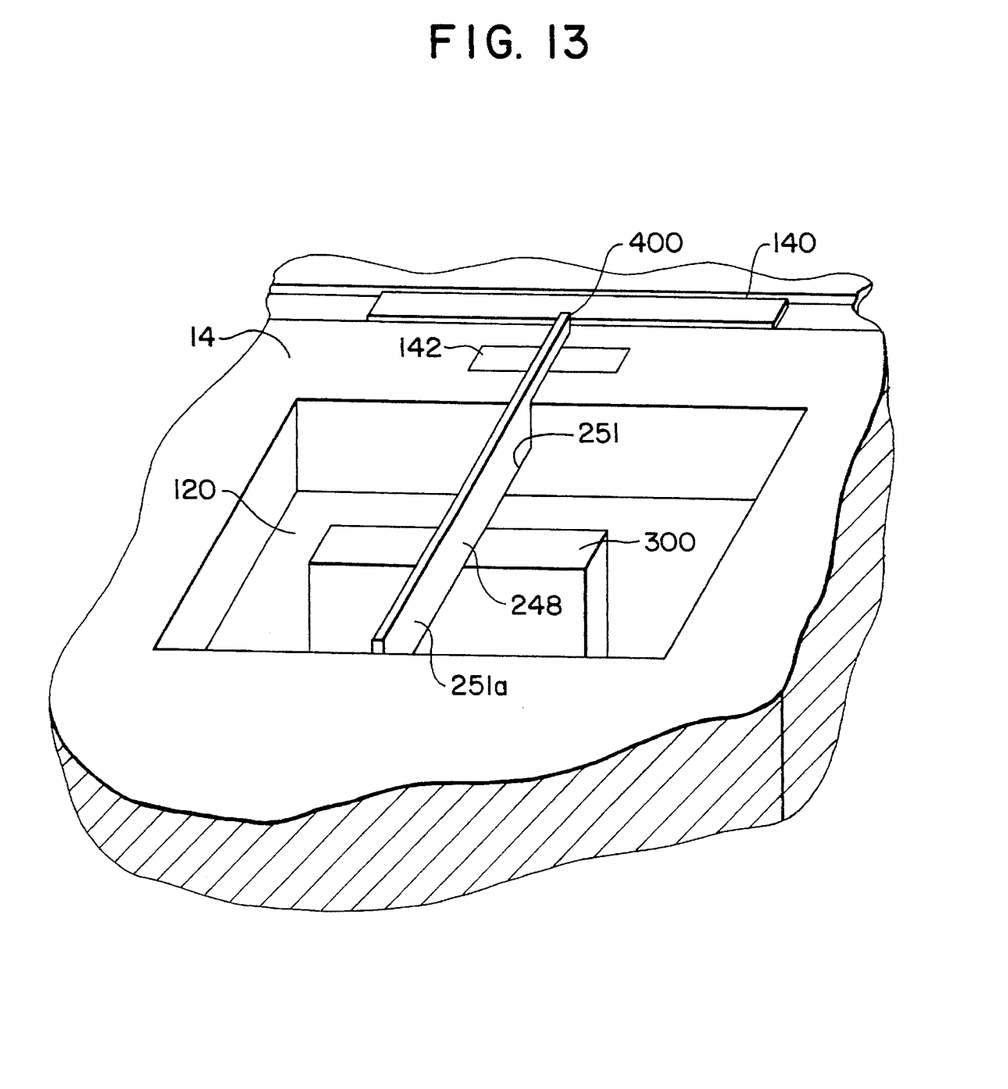

As shown in FIG. 13, the work-piece positioning stop 248 is provided with one longitudinally extending side 251a including edge 251 which is equal to the width of opening 120. Insertion of side 251a into opening 120 and aligning this side 251a with the center-line 400 of the movable X-scale 140 enables the alignment of subsequent work-pieces 302 to be cut accordingly.

The movable scale 30 is then located with the center line 500 lined up with the "X" on the work-piece. The movable Y-directional stop members 42a, 42b are then positioned so that the stop edges 47a, 47b, respectively, are located at the positions as noted by numerals 504a, 504b, respectively, on the 504 scale of the movable Y-directional scale 30 (FIG. 8). Stop edges 49a, 49b of Y-directional bushing repeat stop members are also located at the positions 504a, 504b, respectively, on the movable scale 30. Appropriate clamping knobs 48a, 48b and 50a, 50b are then rotated in a tightening position so that the stop members 42a, 42b and 44a, 44b are secured within the recess 40. Upon insertion of the router into the opening 46 in recess 40, the router may then be moved in the X-Y-direction as necessary in cutting the mortise as shown in FIG. 6 and identified by the numeral 304.

It is realized that varying and different embodiments may be made within the scope of the inventive concept herein described because many modifications may be made to the embodiments herein detailed, but it is to be understood that the details herein are to be interpreted as shown and not to be unduly restrictive of the present invention.

What is claimed is:

1. An apparatus for making tenon and mortise cuts in work-pieces comprising:

a table having a first opening in a top surface thereof;

a support for holding a work-piece in a preselected position, said support being detachably connected to said table;

means for positioning said work-piece in said support;

a base assembly for a cutting means slidably mounted onto said table, said base assembly having a second opening therein to receive said cutting means therethrough, said second opening being adjustable and positionable in cutting relation with said first opening in said table and one end of said work-piece; and, means to determine the size and location of said second opening and define the slideable movement of said base assembly onto said table, said second opening size and location and the moveability of said second opening defining the appropriate peripheral cutting boundaries on the end of said work-piece to be subjected to said cutting means.

2. The apparatus of claim 1 wherein said work-piece is wood.

3. The apparatus of claim 1, said support for holding a work-piece in a preselected position detachable to said table includes a work-piece holding assembly, said work-piece holding assembly including a movable work-piece holding member with a clamping assembly attached to said work-piece holding member.

4. The apparatus of claim 3 wherein said movable work-piece holding member includes a front face to receive a work-piece thereon and said clamping assembly includes a movable clamping bar, said work-piece being sandwiched between said movable clamping bar and said front face of said movable work-piece holding member.

5. The apparatus of claim 4 wherein said clamping assembly includes a pair of C-shaped clamps attached to said movable work-piece holding member transverse to and on opposite sides of said front face, said bar being adjustably attached to said C-shaped clamps.

6. The apparatus of claim 5, said C-shaped clamps including means to angularly position said movable work-piece holding member in relation to said top surface of said table.

7. The apparatus of claim 4, said front face of said movable work-piece holding member including vertical slots therein to receive said clamping assembly in adjustable vertical positions therealong.

8. The apparatus of claim 3, said movable work-piece holding member including means to position an end of said work-piece in an angled position to said top surface of said table.

9. The apparatus of claim 8, said means to position said work-piece in relation to said top surface of said table including a detachable stop member having outwardly extending pins at preselected positions on at least one side thereof, said front face having a plurality of openings at preselected positions therein to receive said pins, spacing and location of said openings defining the angle of said stop member in relation to said top surface of said table, said stop member having a work-piece aligning edge for receiving one side of a work-piece therealong.

10. The apparatus of claim 9, said detachable stop member having one longitudinally extending side equal to a width of said first opening and insertable therein whereby said detachable stop member in co-operating relation with said means to determine the size and location of said second opening provides means for alignment of subsequent work-pieces.

11. The apparatus of claim 1 wherein said base assembly is a sliding router base assembly comprising a sliding router base member movable on said top surface of said table, said sliding router base member having stop means to define the X and Y-directional movement of said slideable router base assembly.

12. The apparatus of claim 11 wherein said sliding router base assembly includes stop means therein to define the movement of said router within said second opening.

13. The apparatus of claim 1 wherein said table includes a first scale member to determine the X-directional movement of said cutting means.

14. The apparatus of claim 13 wherein said first scale member is movably mounted onto said top surface of said table.

15. The apparatus of claim 13 wherein said first scale member includes a movably mounted scale and a fixedly mounted scale on said top surface of said table.

16. The apparatus of claim 1 wherein said base assembly includes a second scale member thereon to determine the Y-directional movement of said cutting means.

17. The apparatus of claim 16 wherein said second scale member is movably mounted onto said base assembly.

18. The apparatus of claim 16 wherein said second scale member includes a movably mounted scale and a fixedly mounted scale on said base assembly.

* * * * *